Patented May 30, 1933

1,911,639

UNITED STATES PATENT OFFICE

TAKEO MIYAGUCHI, OF TOYOTAMA GUN, TOKYO FU, AND MATSUO FUKUI, OF KAMAKURA GUN, KANAGAWA KEN, JAPAN

PROCESS FOR MANUFACTURING A NEW SORT OF COLLOIDAL CARBOHYDRATE

No Drawing. Application filed July 28, 1931, Serial No. 553,696, and in Japan March 2, 1931.

Our invention relates to process for manufacturing a new sort of colloidal carbohydrate by dissolving sugar in concentrated sulphuric acid at a low temperature, then neutralized and the precipitate removed.

The object of the invention is to obtain a colloidal carbohydrate not ever known and which may be used as a seasoning agent for improving the taste of other food and drink and also for medical treatment and the like.

According to the present invention sugar (for instance cane sugar or beet sugar) is dissolved in concentrated sulphuric acid keeping at a low temperature to avoid the formation of any humus matter. The solution is then neutralized and the precipitate is removed and dried whereby colloidal carbohydrate is obtained.

The article manufactured according to the present invention is a white, tasteless and odorless solid matter. It is soluble in ethyl alcohol. Said solution is colloidal and gives the Tyndall effect. A small quantity of this article, solid or solution, added in food or drink gives a very nice taste to the latter. It has also a remarkable soothing effect on human skin.

Whether this matter is a metamer, polymerization or condensation product or dehydrated matter of sugar is not certain at present, but it is probably thought to be the last mentioned one. No similar or equivalent matter is to be found in the known literatures.

It is already known that cane sugar dissolves in concentrated sulphuric acid in yellow color and finally it chars, but neither it has been noticed about the change of cane sugar in this case nor it has been got apart. Humus matter of a black color has been inevitably produced in hitherto known experiments. Whereas, the article manufactured according to the present invention being of a white color is deemed to be something which is quite different from humus matter or the like. If it be a known kind of dehydrated sugar it must be either one of the following: 1. Glucosan calamelin, 2. Calamelen, or 3. Calamelan. Said first one is bitter in taste and the first and second ones do not dissolve in alcohol. The third one being of a black color, all of them entirely differ from that of the present invention as to their physical properties. The article manufactured according to the present invention is found to be a new sort of colloidal carbohydrate not having previously been manufactured.

Said matter is tasteless by itself, but a small quantity of which added to food or drink remarkably improves the taste of the latter. It is probably thought, therefore, that this matter develops its taste in the existence of other taste, as in the case of latent sound which can not be heard by itself but strongly effects on the other audible sound. The matter is much useful as seasoning agent because of its taste. Besides it has a peculiar effect on smoothing human skin as stated, and may also be effectively used for medical treatment or for medical aid, which is now in the course of investigation.

An example of carrying out the present invention is explained.

(1). 1,000 grms of sugar is gradually dissolved into 1,500 grms of concentrated sulphuric acid (55° Baumé). The solution is cooled to a temperature not exceeding 5° C., in order to prevent the formation of any humus matter. The solution is left standing for about 24 hours or until a small quantity of the solution taken from the bulk of the solution tested with calcium carbonate and filtered is found to be tasteless.

(2). The solution obtained at the above step is added with 3,000 grms of water and lime water at an equivalent quantity to the sulphuric acid used, to be thoroughly neutralized. The solution is then filtered to remove the precipitate.

(3). The solution is then added with 50 grms of active charcoal and filtered again to remove the humus matter which may have been produced in a slight degree.

(4). A trace of calcium sulphate which may have been left at the second step is then precipitated by addition of alcohol and a solution quite free from color, taste and smell is obtained.

(5). The water in the solution is then evaporated and finally is dried by means of a vacuum pan. The matter thus manufactured is a white, tasteless and odorless solid which is soluble in common alcohol and quite free from sulphur.

Having now particularly described and ascertained the nature of our said invention and in what manner the same is to be performed we declare that what we claim is:—

In a process for manufacturing a novel colloidal carbohydrate, the steps of dissolving sugar in sulphuric acid concentrated to 55° Baumé, performing the operation at a temperature not exceeding 5° C., neutralizing the solution, and finally evaporating the solution to reclaim the precipitate.

In testimony wherefor we have affixed our signatures.

TAKEO MIYAGUCHI.
MATSUO FUKUI.